United States Patent
Charon (10) Patent No.: US 6,817,807 B1
(45) Date of Patent: Nov. 16, 2004

(54) MODULAR DITCH LINERS

(76) Inventor: James W. Charon, 700 Waters Edge Rd., Racine, WI (US) 53402

( * ) Notice: Subject to any disclaimer, the term of this patent is extended or adjusted under 35 U.S.C. 154(b) by 0 days.

(21) Appl. No.: 10/457,213

(22) Filed: Jun. 9, 2003

Related U.S. Application Data (63) Continuation of application No. 10/245,026, filed on Sep. 17, 2002, now Pat. No. 6,698,977.

(51) Int. Cl.[7] ................................. E02B 5/02
(52) U.S. Cl. .................. 405/118; 405/121; 210/170; 210/747
(58) Field of Search ................. 405/118, 119, 405/120, 121, 122, 123; 404/2–5; 52/11–13; 210/163, 164, 170, 747

(56) References Cited

U.S. PATENT DOCUMENTS

| | | | |
|---|---|---|---|
| 3,299,641 A | * | 1/1967 | Heagler et al. ............. 405/270 |
| 3,625,011 A | * | 12/1971 | Stevenson ...................... 404/2 |
| 3,854,292 A | | 12/1974 | Nienstadt ..................... 405/270 |
| 4,149,710 A | * | 4/1979 | Rouchard ................... 405/121 |
| 4,878,782 A | * | 11/1989 | Beattie et al. .............. 405/119 |
| 5,226,748 A | | 7/1993 | Barenwald et al. ......... 405/121 |
| 5,372,457 A | * | 12/1994 | Rante .......................... 405/119 |
| 5,443,327 A | | 8/1995 | Akkala et al. .............. 405/118 |
| 5,522,675 A | | 6/1996 | Gunter ........................ 405/118 |
| 5,803,662 A | * | 9/1998 | Gunter ........................... 404/4 |
| 5,853,265 A | * | 12/1998 | Gunter ........................ 405/118 |
| 6,698,977 B1 | * | 3/2004 | Charon ........................ 405/118 |

* cited by examiner

Primary Examiner—Jong-Suk (James) Lee
(74) Attorney, Agent, or Firm—Donald J. Ersler (57) ABSTRACT

An open modular ditch liner includes a plurality of open liner sections and at least one alignment key. A substantially concave shape is formed in a top of each open liner section. At least one key slot is preferably formed on at least one side of each open liner section to receive at least one alignment key. The key slot may have an interference fit. An angle may be formed on at least one end of each open liner section. A key block with the same length of a open liner section may be used as an alignment key. A riser block may be used to terminate at least one side of at least one open liner section.

20 Claims, 13 Drawing Sheets

MODULAR DITCH LINERS

CROSS-REFERENCES TO RELATED APPLICATIONS

This is a continuation-in-part application taking priority from Ser. No. 10/245,026 filed on Sep. 17, 2002, now U.S. Pat. No. 6,698,977.

BACKGROUND OF THE INVENTION

1. Field of the Invention

The present invention relates generally to ditch liners and more specifically to modular ditch liners, which allow a ditch liner to be assembled from a plurality of ditch liner sections.

2. Discussion of the Prior Art

There are two different types of ditch liners. The first type of ditch liner is an open ditch liner. An example of an open type of ditch liner is found in U.S. Pat. No. 3,854,292 to Nienstadt. Nienstadt uses a relatively light plastic resin that is retained with a quantity of stakes. The second type of ditch liner is a closed ditch liner. The closed ditch liner includes a substantially U-shaped trough with a cover. The cover may have openings formed therethrough. Three examples of closed type ditch liners are found in U.S. Pat. No. 5,226,748 to Barenwald et al., U.S. Pat. No. 5,443,327 to Akkala et al., and U.S. Pat. No. 5,522,675 to Gunter. The Barenwald et al. and Gunter patents disclose using relatively complicated connecting devices to retain each liner section in tight connection to each other.

Accordingly, there is a clearly felt need in the art for a modular ditch liner which is fabricated from a heavy, yet economical material; does not require a relatively complicated connecting device; and does not require a perfect trench for installation.

SUMMARY OF THE INVENTION

The present invention provides a modular ditch liner that does not require complicated installation and assembly. An open modular ditch liner includes a plurality of open liner sections and at least one alignment key. The cross section of each open liner section includes a substantially concave shape formed on a top thereof. The plurality of open liner sections are preferably fabricated from cement block on a cement block casting machine. Casting cement blocks is a cost effective manufacturing process relative to cast iron or open cast molding. A key slot is formed on at least one side of each open liner section to receive a single alignment key. However, the at least one key slot may be replaced with at least one key opening. Each key opening is formed through a length of the open liner section, near a side thereof. The key opening is sized to receive an alignment key.

A closed modular ditch liner includes a plurality of closed liner sections, a plurality of covers, and at least one alignment key. The cross section of each closed liner section includes at least one trough contour and a single cover retention lip formed on a top end of each side thereof. The plurality of closed liner sections and covers are preferably fabricated from cement block on a cement block casting machine. Each cover is laterally retained between the two cover retention lips. A key slot is formed on at least one side of the closed liner section to receive a single alignment key. However, the at least one key slot may be replaced with at least one key opening. Each key opening is formed through a length of the closed liner section, near a side thereof. The key opening is sized to receive an alignment key.

The key slot may also include a positive taper or an interference fit. The key slot with an interference fit may have the shape of a negative taper or a substantially rounded shape. The key slot with an interference slot would provide an interference fit to an alignment key. The alignment key includes a block embodiment or an extruded embodiment. The block alignment key would be preferably used in the positive taper key slot. The length of a block alignment key would preferably be as long as an open liner section. Each block alignment key would engage two adjacent open liner sections. The extruded alignment key would be fabricated from an extruded material and preferably retained in an interference fit key slot.

An alignment key may be replaced by a riser section. The riser section includes a side member and an alignment key projection. The length of the riser section is preferably the same as that of the open liner section. The side member constrains the flow of fluid relative to the open liner section. The alignment key projection is sized to be received by one of the key slots of the open liner section. Further, the open liner sections may be formed as a trapezoid to allow the open liner sections to fit curved drain ditch applications. At least one end of the open liner section is angled.

Accordingly, it is an object of the present invention to provide a modular ditch liner that is fabricated from a heavy, yet economical material.

It is a further object of the present invention to provide a modular ditch liner that utilizes an uncomplicated connection device.

Finally, it is another object of the present invention to provide a modular ditch liner that does not require the creation of a perfect trench for installation.

These and additional objects, advantages, features and benefits of the present invention will become apparent from the following specification.

DETAILED DESCRIPTION OF THE PREFERRED EMBODIMENTS

Figure 1:
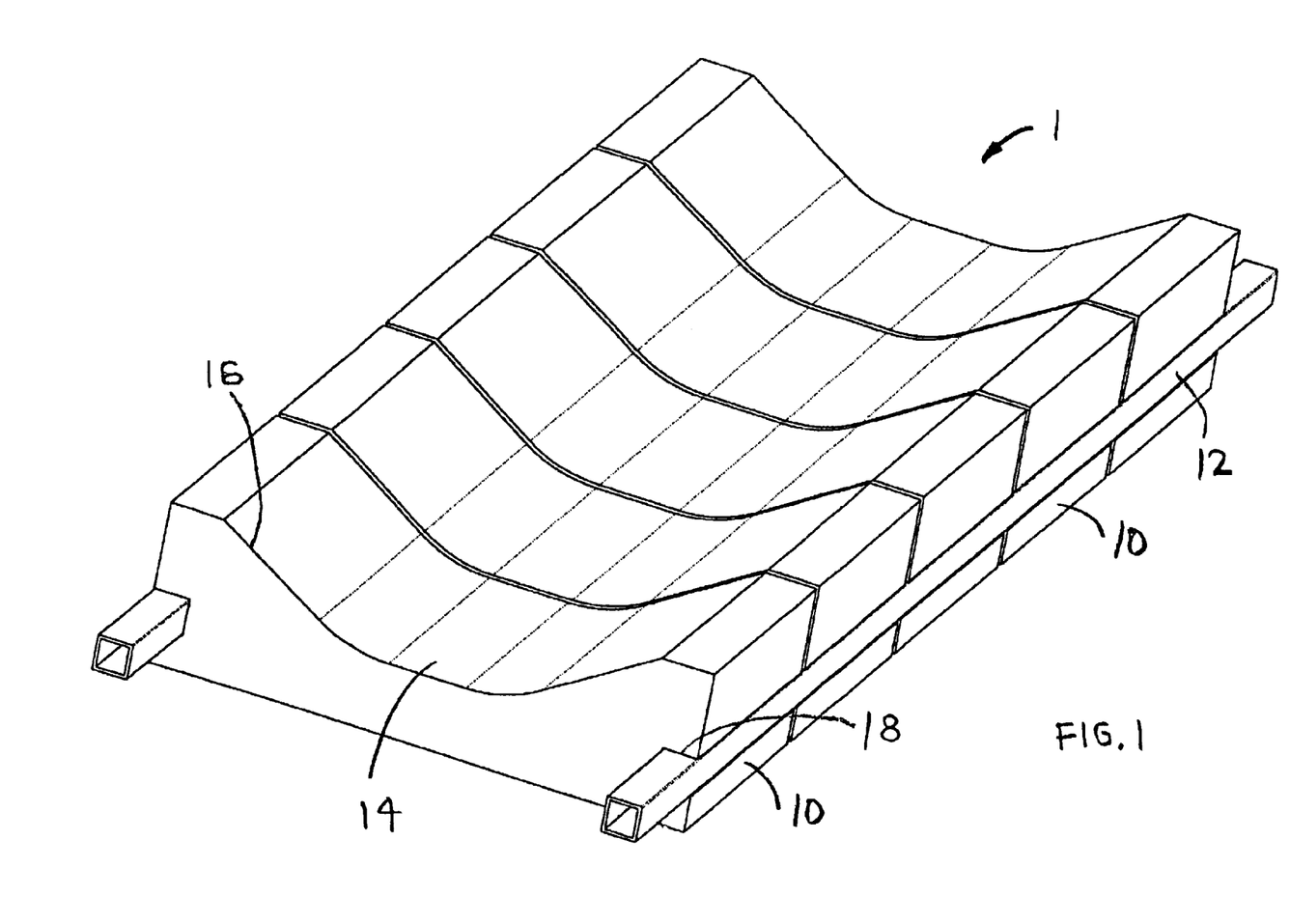
FIG. 1 is a perspective view of an open modular ditch liner in accordance with the present invention.
Figure 2:
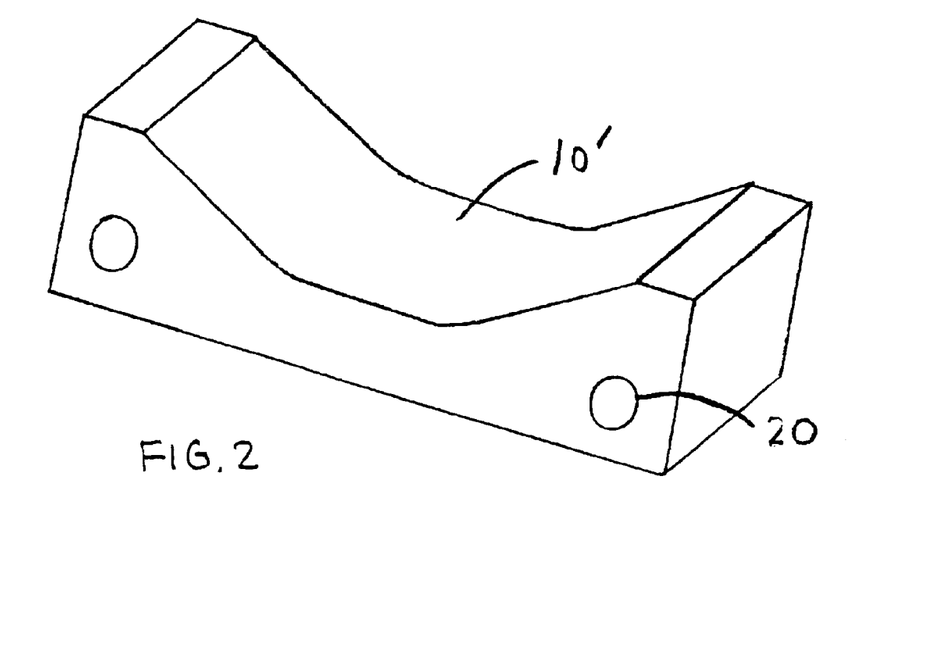
FIG. 2 is a perspective view of an open liner section with two key openings formed therethrough in accordance with the present invention.
Figure 3:
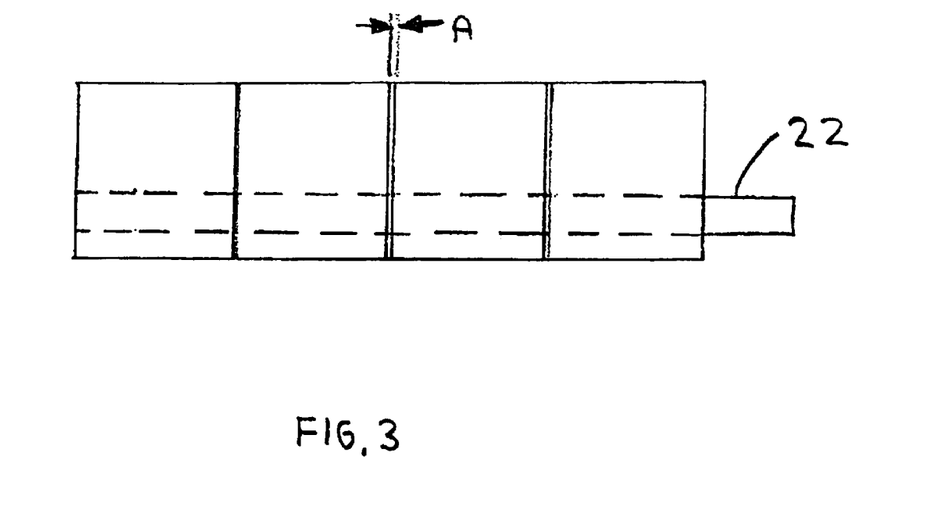
FIG. 3 is a side view of an open modular ditch liner in accordance with the present invention.
Figure 4:
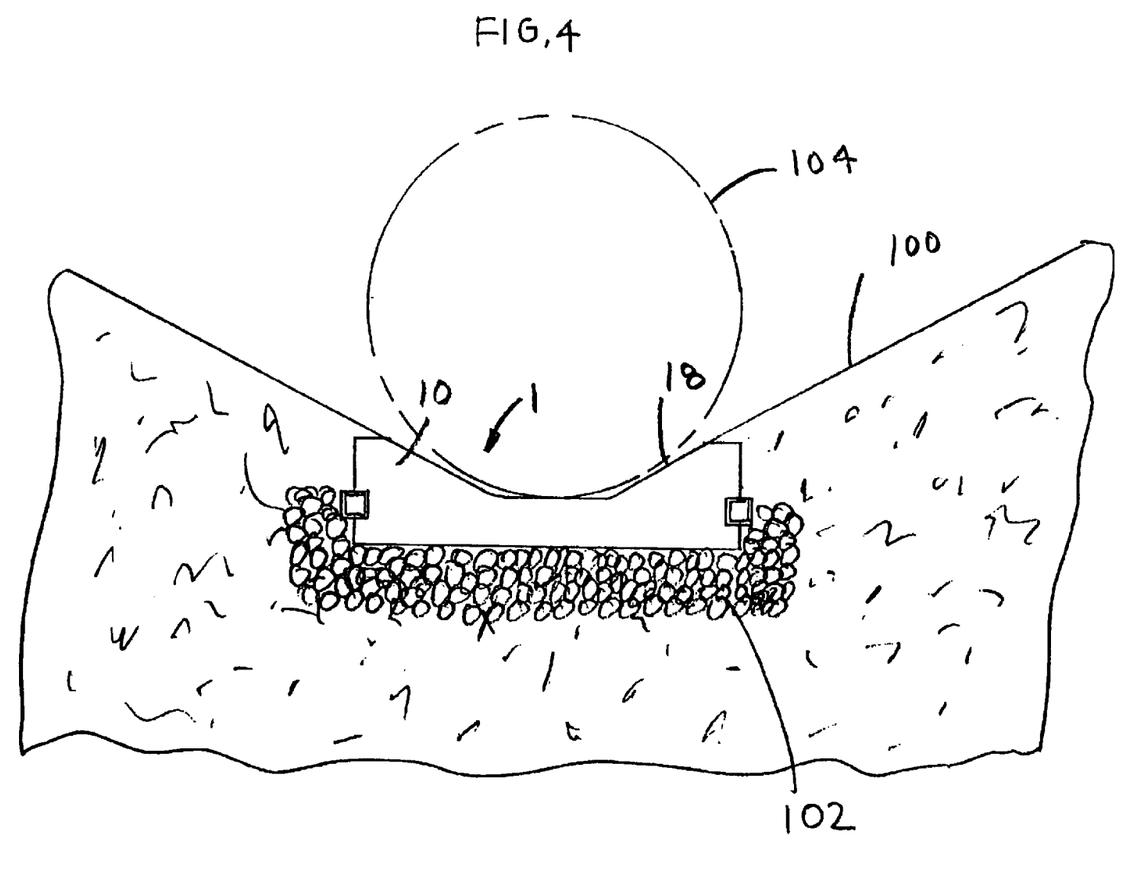
FIG. 4 is a cross sectional view of a trench with an open modular ditch liner contained therein in accordance with the present invention.

With reference now to the drawings, and particularly to FIG. 1, there is shown a perspective view of an open modular ditch liner 1. With reference to FIGS. 2–4, the open modular ditch liner 1 includes a plurality of open liner sections 10 and at least one alignment key 12. The cross section of each open liner section 12 includes a substantially concave shape 14 formed on a top thereof. Preferably, a tapered surface 16 terminates each end of the substantially concave shape 14. The tapered surfaces 16 are structured to align with the inclines of each side of a ditch 100. Preferably, a key slot 18 is formed on at least one side of each open liner section 10 to receive a single alignment key 12. An alignment key with a square cross section is shown, but the cross section of the alignment key 12 may be other shapes, such as round. The alignment key 12 retains at least two open liner sections 10 in vertical and horizontal alignment to each other. If the base under one of the open liner sections sinks, the alignment key 12 in the adjacent open liner sections will retain the one open liner section in vertical alignment with the adjacent open liner sections.

The key slot 18 may be replaced with a key opening 20. Each key opening 20 is formed through a length of the open liner section 10', near an end thereof. The key opening 20 is sized to slidably receive the inner alignment key 22. The plurality of open liner sections 10 are preferably fabricated from cement block on a cement block casting machine. Casting cement blocks is a cost effective manufacturing process relative to cast iron or open cast molding. When the open liner sections 10 are placed in the ditch 100, ends of each liner section 10 preferably do not contact each other; a small gap "A" is left between the ends thereof. The value of gap "AA" is preferably between 0.06–0.25. It is beneficial for a small amount of water to drain into the ground below the ditch 100.

Figure 5:
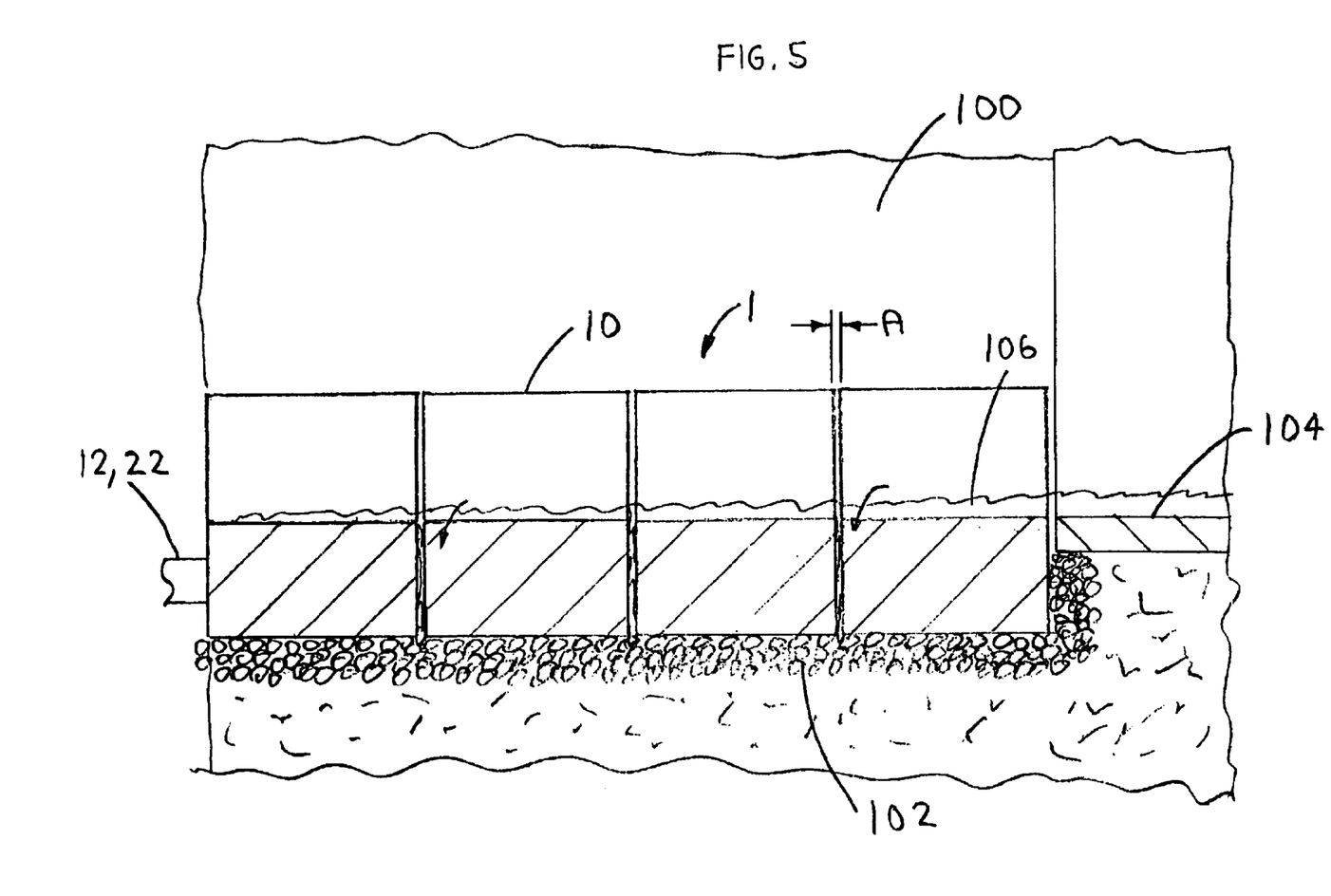
FIG. 5 is a side cross sectional view of a trench with an open modular ditch liner contained therein in accordance with the present invention.

The open modular ditch liner 1 is preferably installed in a ditch 100 with a two inch gravel base 102. A bottom of the substantially concave shape 14 is preferably aligned with the opening of a culvert 104 placed adjacent to the open modular ditch liner 1. With reference to FIG. 5, water 106 that flows through the culvert 104 or drops directly on to the plurality of open liner sections 10 will seep through the gaps between the open liner sections 10 to the gravel base 102. The gaps prevent standing water from forming in the open modular ditch liner 1. The open modular ditch liner 1 is preferably for residential use.

With reference to FIGS. 6–9, a closed modular ditch liner 2 includes a plurality of closed liner sections 26, a plurality of covers 28, and at least one alignment key 30. The cross section of each closed liner section 26 includes a trough contour 32 and a single cover retention lip 34 formed on a top end of each side thereof. Preferably, the cover 28 is sized to be received between the cover retention lips 34. The height of the cover 28 is preferably substantially the same as the height of the cover retention lips 34. Each cover 28 fits over at least one closed liner section 26. The trough contour 32 is preferably U-shaped with two tapered side surfaces 36.

Figure 6:
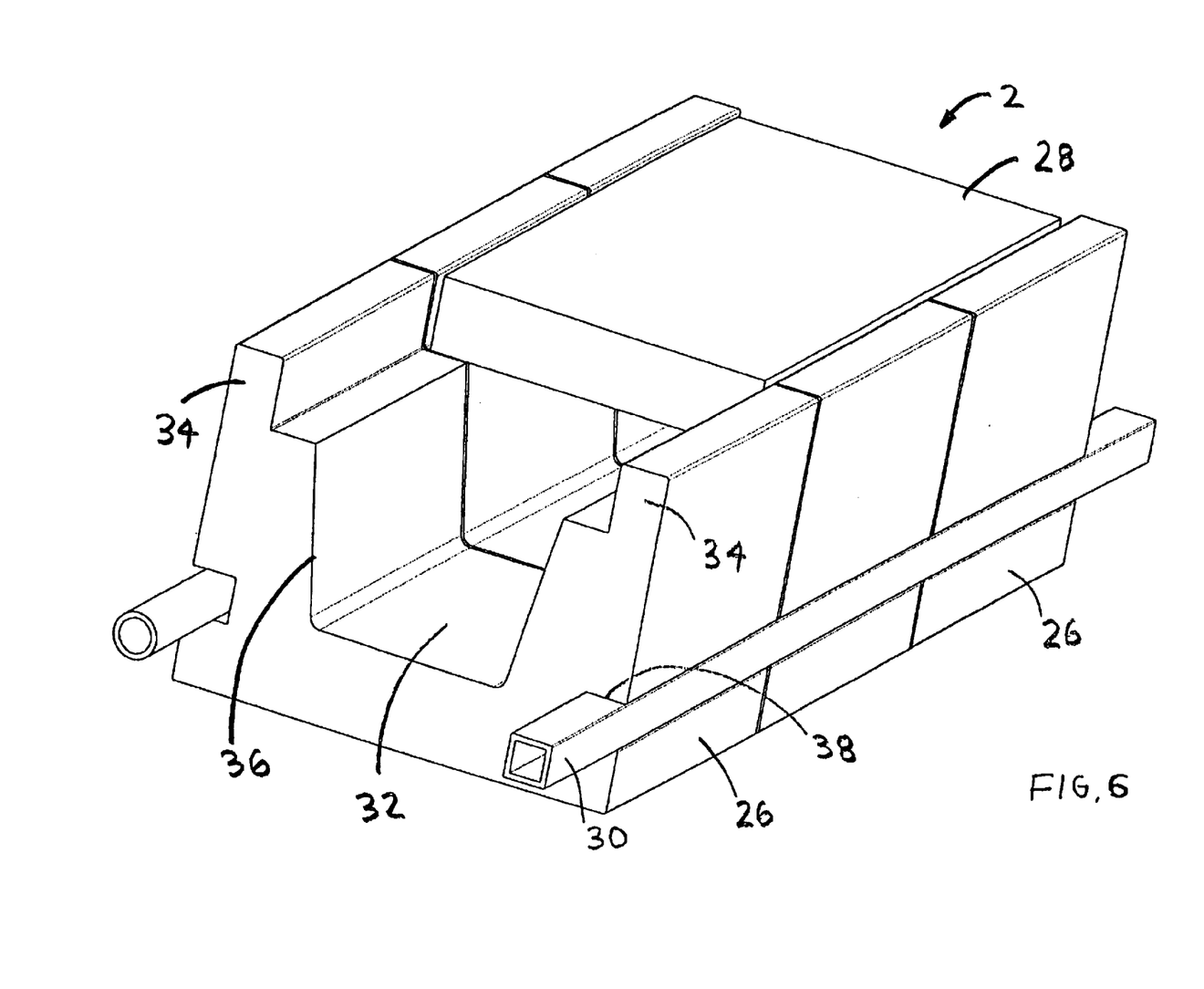
FIG. 6 is a perspective view of a closed modular ditch liner in accordance with the present invention.
Figure 7:
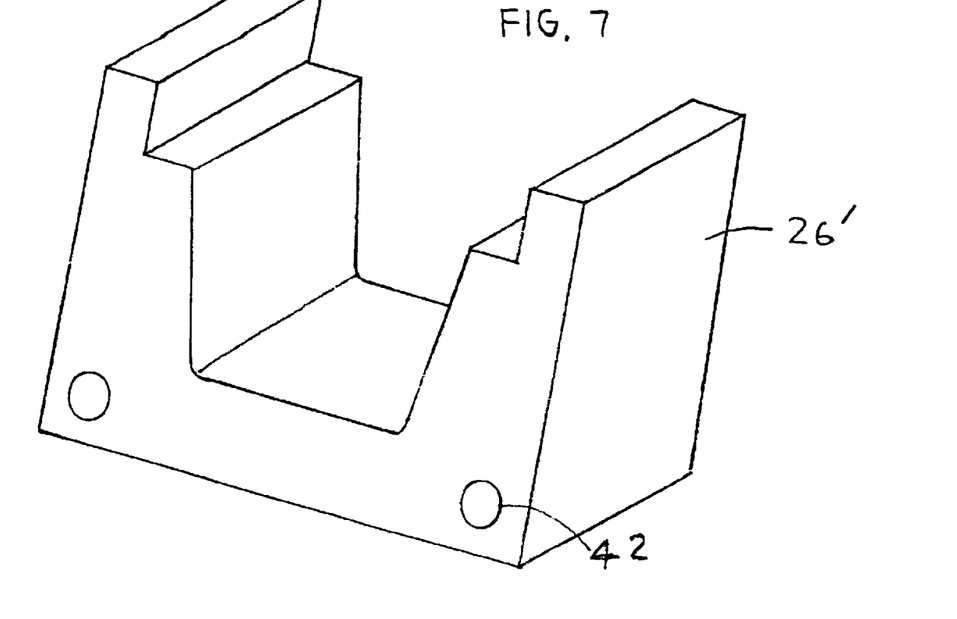
FIG. 7 is a perspective view of a single closed liner section with two key openings formed therethrough in accordance with the present invention.

Preferably, a key slot 38 is formed on at least one side of each closed liner section 26 to receive a single alignment key 30. Alignment keys with round and square cross sections are shown, but the cross section of the alignment keys may have other shapes, such as being triangular. The alignment key 30 retains at least two closed liner sections 26. If the base under one of the closed liner sections sinks, the alignment key 12 in the adjacent closed liner sections will retain the one closed liner section in vertical alignment with the adjacent closed liner sections.

The key slot 38 may be replaced with a key opening 42. Each key opening 42 is formed through a length of the closed liner section 26', near an end thereof. The key opening 42 is sized to slidably receive the inner alignment key 44. The plurality of closed liner sections 26 and the covers 28 are preferably fabricated from cement block on a cement block casting machine. A channel 110 is dug deep enough in a bottom of a ditch 108 to allow the top edges of the closed modular ditch liner 2 to be flush with the tapered sides of the ditch 108.

Figure 10:
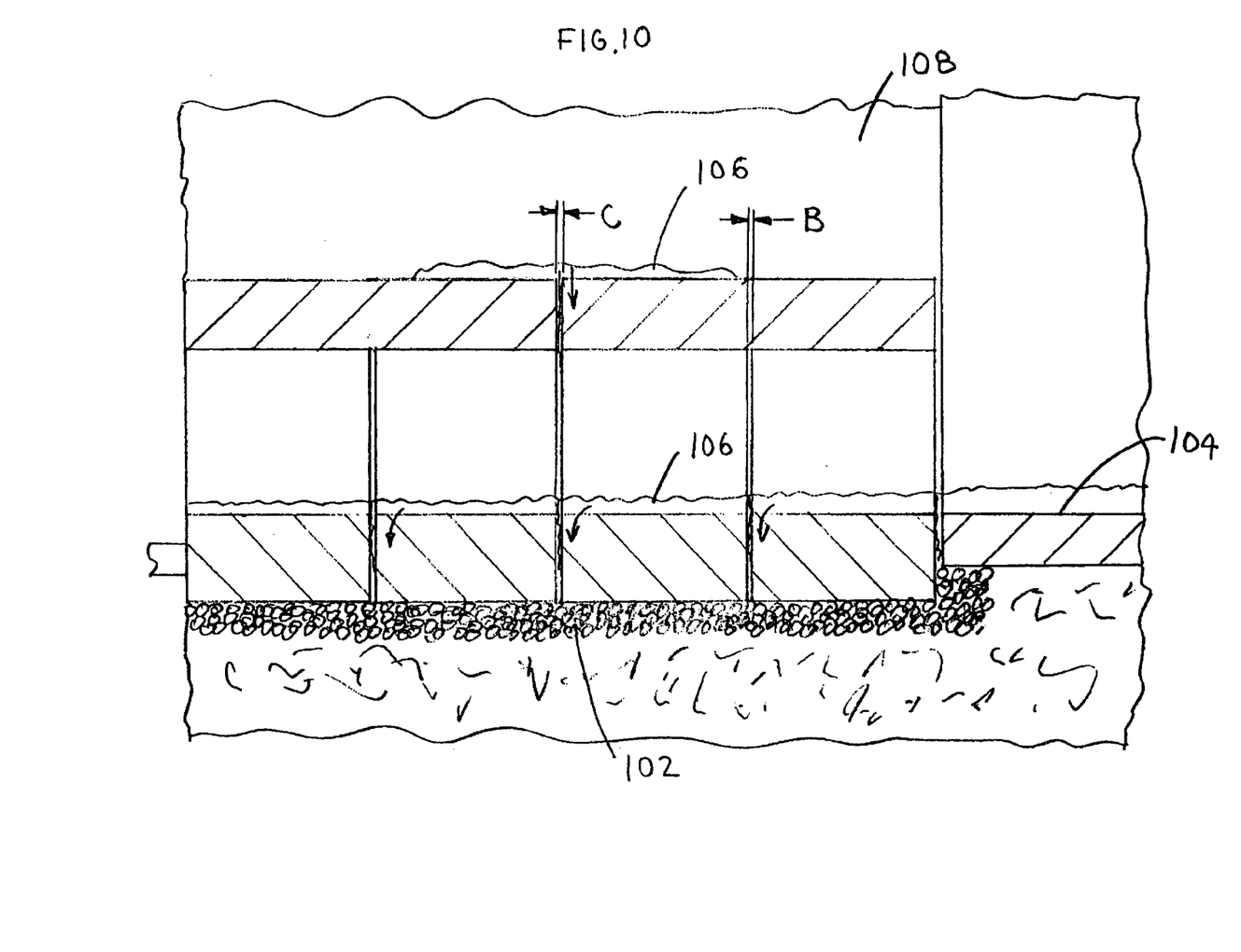
FIG. 10 is a side cross sectional view of a trench with a closed modular ditch liner contained therein in accordance with the present invention.

With reference to FIG. 10, when the closed liner sections 26 are placed in the channel 110, ends of each liner section 26 preferably do not contact each other; a small gap "B" is left between the ends thereof. The value of gap "B" is preferably between 0.06–0.25. It is beneficial for a small amount of water to drain into the ground below the ditch 108. The ends of the covers 28 preferably do not contact each other to allow water to drain into the plurality of closed liner sections 26. A gap "C" is left between the covers to allow water 106 to drain into the plurality of closed liner sections 26. The value of gap "C" is preferably between 0.06–0.25.

The closed modular ditch liner 2 is preferably installed in a ditch 108 with a two inch gravel base 102. A bottom of the trough contour 32 is preferably aligned with the opening of a culvert 104 placed adjacent to the closed modular ditch liner 2. Water 106 flows through the culvert 104 or seeps through the gaps between the plurality of covers 28, will seep through the gaps between the closed liner sections 26 to the gravel base 102. The gaps prevent standing water from forming in the closed modular ditch liner 2. The closed modular ditch liner 2 is preferably for residential use.

Figure 11:
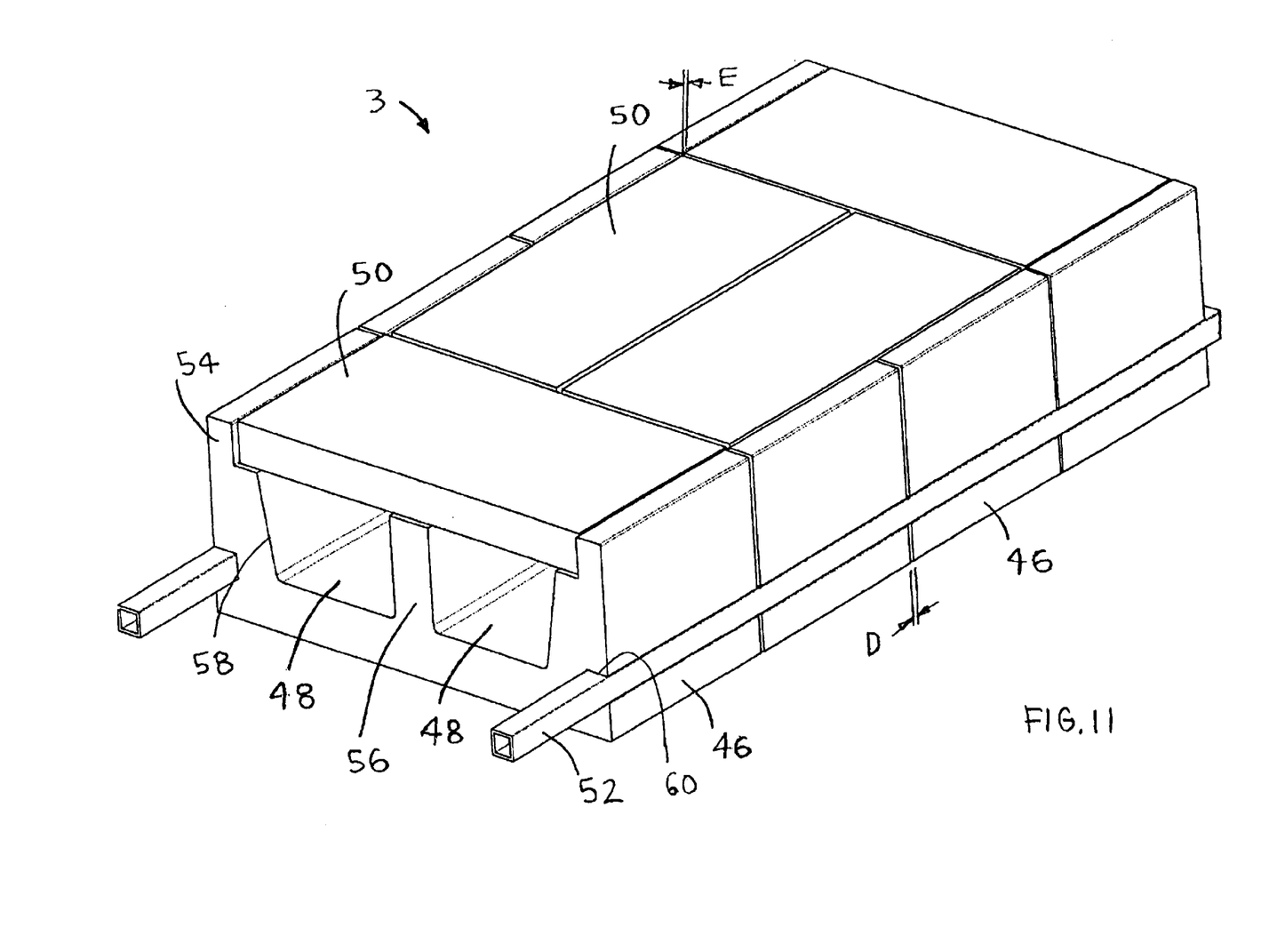
FIG. 11 is a perspective view of a closed modular ditch liner having two trough contours in accordance with the present invention.

FIG. 11 shows a closed modular ditch liner 3 where each closed liner section 46 has two trough contours 48. The closed modular ditch liner 3 includes a plurality of closed liner sections 46, a plurality of covers 50, and at least one alignment key 52. The cross section of each closed liner section 46 includes the two trough contours 48 and a single cover retention lip 54 formed on a top end of each side thereof. A support pedestal 56 is formed between the two trough contours 48 to support at least one cover 50. Preferably, the cover 50 is sized to be received between the cover retention lips 54. The height of the cover 50 is preferably the same as the height of the cover retention lips 54.

Each cover 50 fits over at least one closed liner section 46. The plurality of covers 50 may be placed perpendicular or in parallel to a length of the plurality of closed liner sections 46. The trough contour 48 is preferably U-shaped with one tapered side surface 58 and a straight side formed by one side of the support pedestal 56. Preferably, a key slot 60 is formed on at least one side of each closed liner section 46 to receive a single alignment key 52. An alignment key with a square cross section is shown, but the cross section of the alignment key 52 may be other shapes, such as round. The alignment key 52 retains at least two closed liner sections 46.

Figure 8:
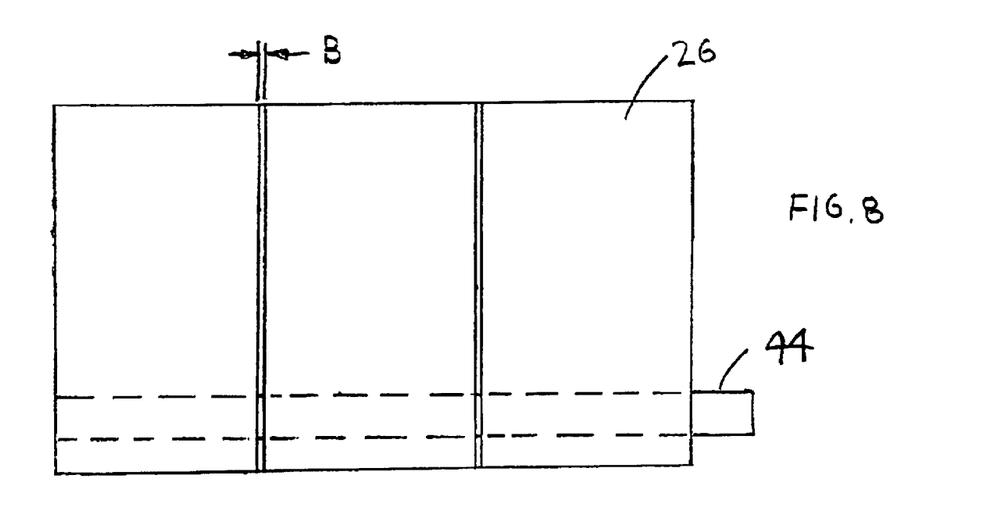
FIG. 8 is a side view of a closed modular ditch liner in accordance with the present invention.
Figure 9:
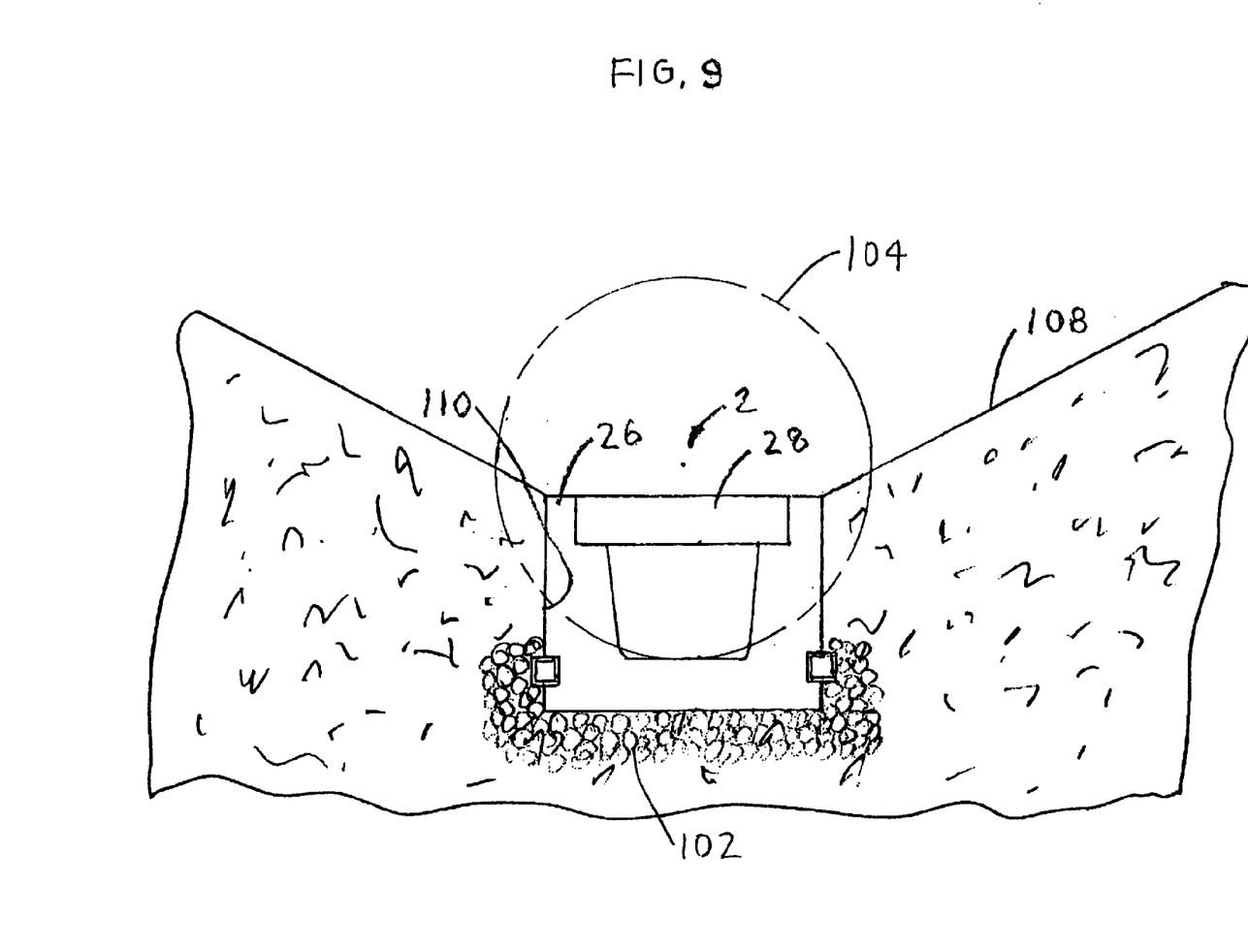
FIG. 9 is a cross sectional view of a trench with a closed modular ditch liner contained therein in accordance with the present invention.

The key slot 60 may be replaced with a key opening as shown in FIG. 6. The plurality of closed liner sections 46 and the covers 50 are preferably fabricated from cement block on a cement block casting machine. The closed modular ditch liner 3 is positioned in a ditch such that the top edge is flush with the tapered sides of the ditch 102 as shown in FIG. 8. The closed liner sections 46 preferably do not contact each other, a small gap "D" is left between the ends thereof. A small gap "E" is preferably maintained between each cover 50. The value of gaps "D" and "E" are preferably between 0.06–0.25. It is beneficial for a small amount of water to drain into the ground below a ditch. The open modular ditch liner 3 is preferably for residential use.

Figure 12:
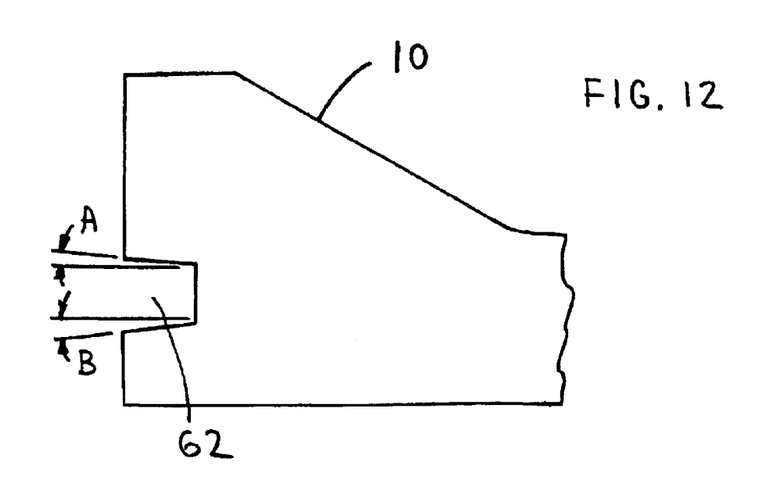
FIG. 12 is a partial end view of an open liner section with a positive taper key slot of an open modular ditch liner in accordance with the present invention.
Figure 13:
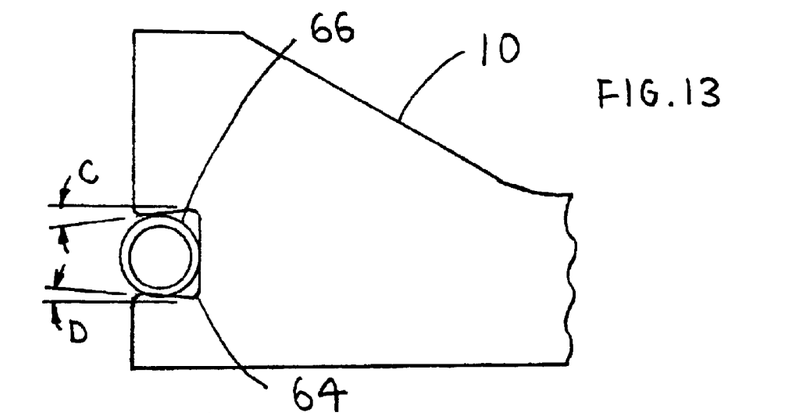
FIG. 13 is a partial end view of an open liner section with a negative taper key slot of an open modular ditch liner in accordance with the present invention.
Figure 14:
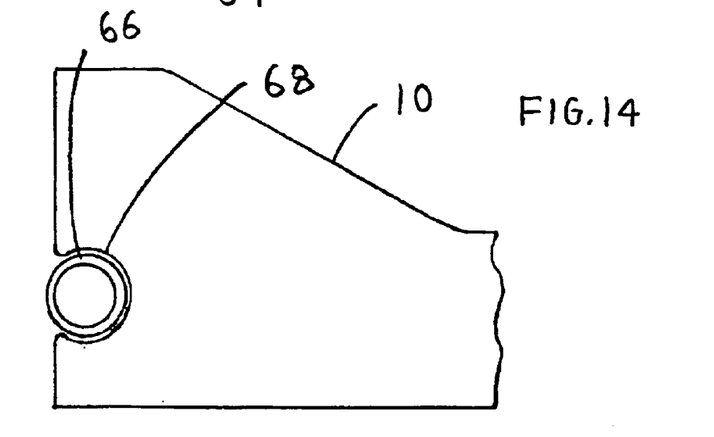
FIG. 14 is a partial end view of an open liner section with a substantially round key slot of an open modular ditch liner in accordance with the present invention.

With reference to FIGS. 12–14, the key slot may also include a positive taper or an interference fit. At least one positive taper key slot 62 is formed in an open liner section 10. The at least one positive taper key slot 62 may be formed on one wall of the open liner section 10 or on both walls. An angle "AA" of one wall preferably has a range of between 0.5 to 5 degrees, but other angles may also be used. An angle "B" of the other wall preferably has a range of between 0.5 to 5 degrees, but other angles may also be used. An alignment key is received by the at least one positive taper key 62 in at least two adjacent open liner sections 10.

The key slot with an interference fit may have the shape of a negative taper or a substantially rounded shape. However, other shapes of interference key slots may also be used, besides the negative taper or substantially round. The key slot with an interference slot would provide an interference fit to an alignment key. At least one negative taper key slot 64 is formed in the open liner section 10. The taper may be formed on one wall of the negative taper key slot 64 or on both walls. An angle "C" of one wall preferably has a range of between 0.5 to 5 degrees, but other angles may also be used. An angle "D" of the other wall preferably has a range of between 0.5 to 5 degrees; but other angles may also be used. An interference alignment key 66 may be compressed to be inserted or removed from the negative taper key slot 64. The interference alignment key 66 must be fabricated from a resilient material to allow compression thereof. However, the interference alignment key 66 could also be inserted from an end of the open liner section 10.

At least one substantially round key slot 68 is formed in an open liner section 10. The substantially round key slot 68 is sized to receive the interference alignment key 66. The interference alignment key 66 may be compressed to be inserted or removed from the substantially round key slot 68. The interference alignment key 66 could also be inserted from an end of the open liner section 10.

Figure 15:
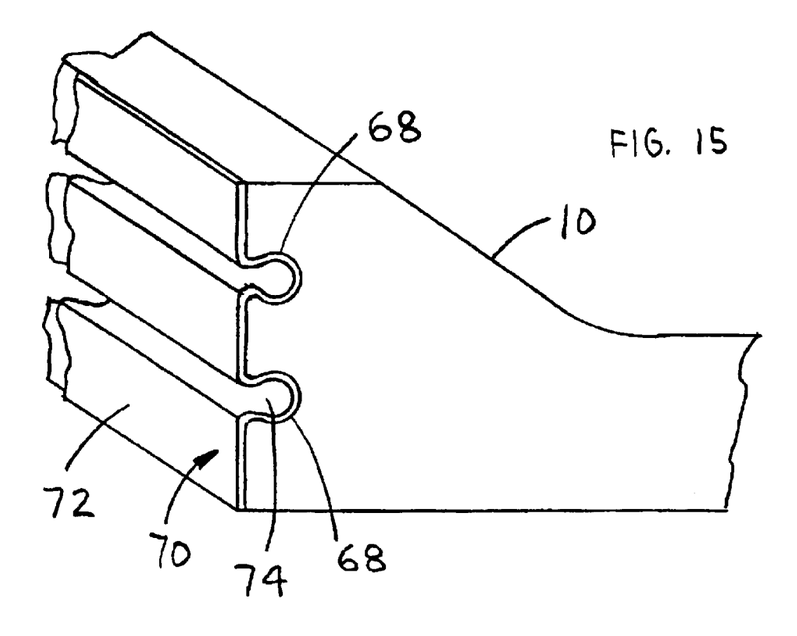
FIG. 15 is a partial perspective view of an extruded alignment key of an open modular ditch liner in accordance with the present invention.

The alignment key may also include an extruded embodiment or a block embodiment. With reference to FIG. 15, an extruded alignment key 70 preferably includes a key base 72 and at least one key projection 74 extending from the key base 72. At least one substantially round key slot 68 is formed in the open liner section 10 to receive the at least one key projection 74. However, other shapes of interference key slots and key projections may also be used, besides substantially round. The extruded alignment key 70 must be fabricated from a resilient material to allow the at least one key projection 74 to be compressed for insertion into the at least one substantially round key slot 68. The extruded alignment key 70 may also be inserted from an end of the open liner section 10. The extruded alignment key 70 is preferably long enough to retain a plurality of open liner sections 10.

Figure 16:
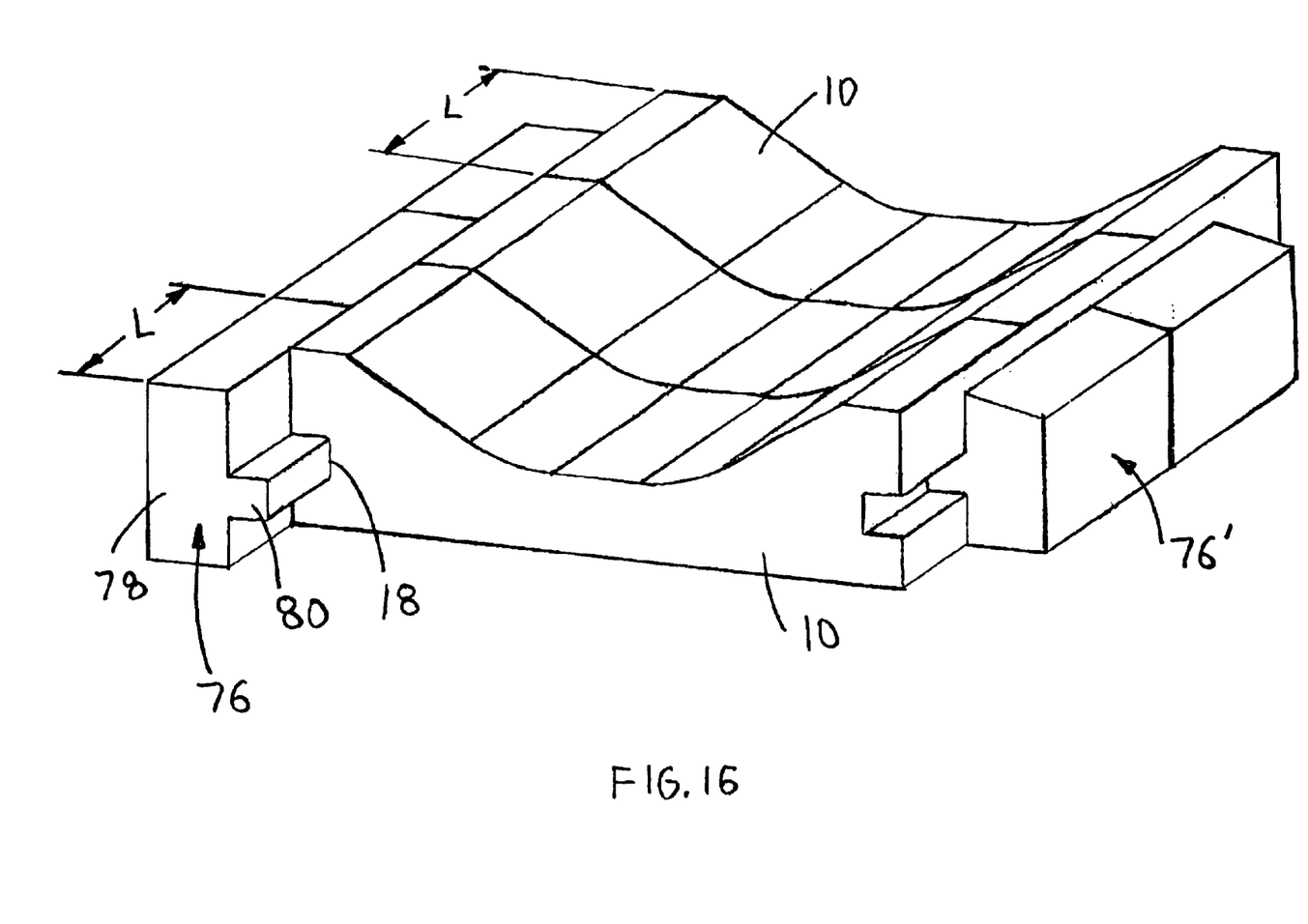
FIG. 16 is a perspective view of a plurality of block alignment keys engaged with a plurality of open liner sections of an open modular ditch liner in accordance with the present invention.

With reference to FIG. 16, a block alignment key 76 includes a block base 78 and a key projection 80 extending from the block base 78. A key slot 18 is disposed in the open liner section 10. The block alignment key 76 preferably has the same length "L" as the open liner section 10. Each block alignment key 76 is positioned to engage two adjacent open liner sections 10. A block alignment key 76' does not have the same height as the open liner section 10.

Figure 17:
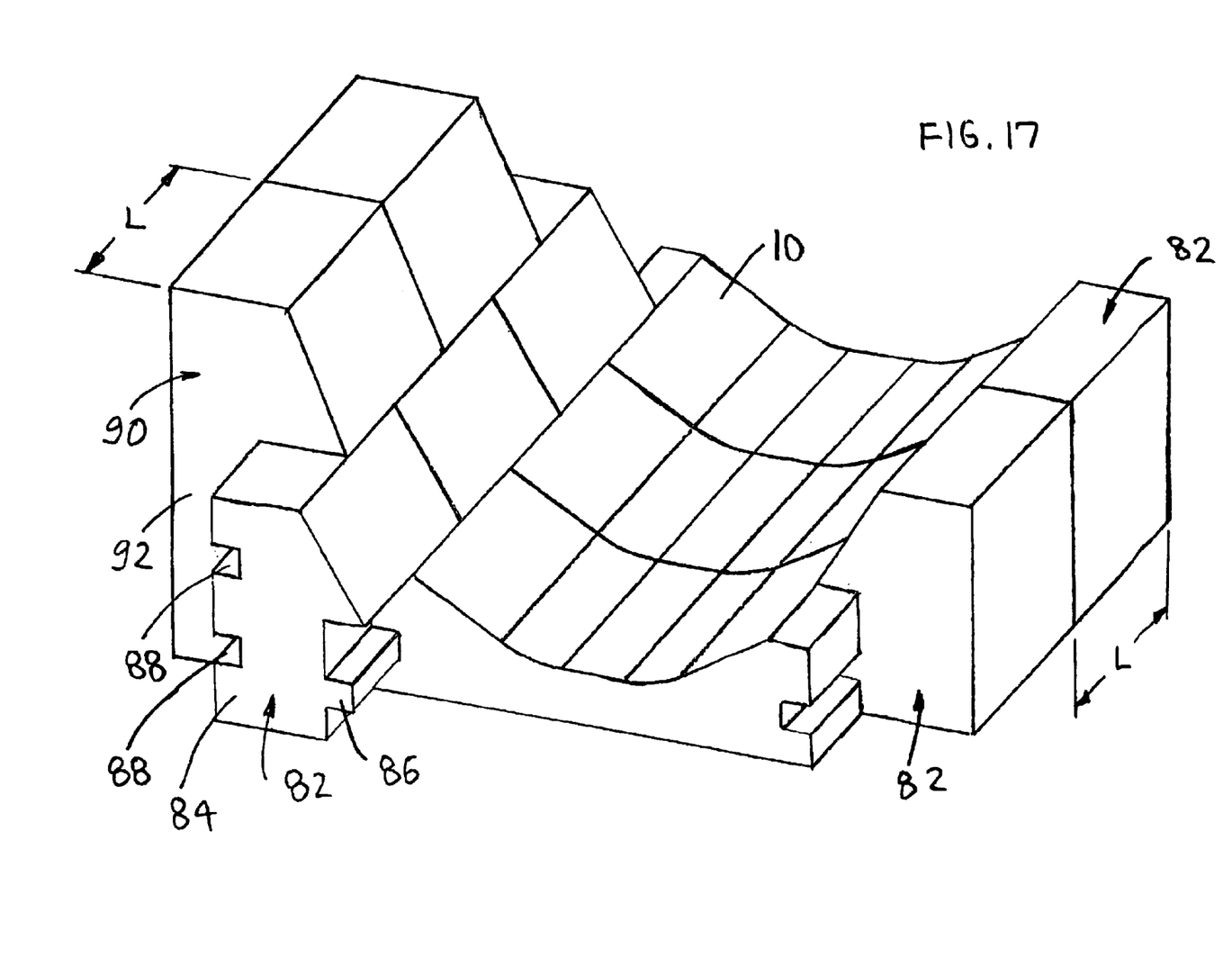
FIG. 17 is a perspective view of a plurality of riser blocks engaged with a plurality of open liner sections of an open modular ditch liner in accordance with the present invention.

With reference to FIG. 17, an alignment key may be replaced by at least one riser section. A first riser section 82 includes a first side member 84 and a first key projection 86 extending from the first side member 84. The first riser section 82 may also include at least one key slot 88 for receiving at least one second key projection of a second riser section 90. The second riser section 90 includes a second side member 92 and the at least one second key projection (not shown) extending from the second side member 92. Lengths of the first and second riser sections are preferably the same as that of the open liner section 10. The first side member 84 constrains the flow of fluid relative to the open liner section 10. The second side member 92 constrains the flow of fluid relative to the first side member 84.

Figure 18A:
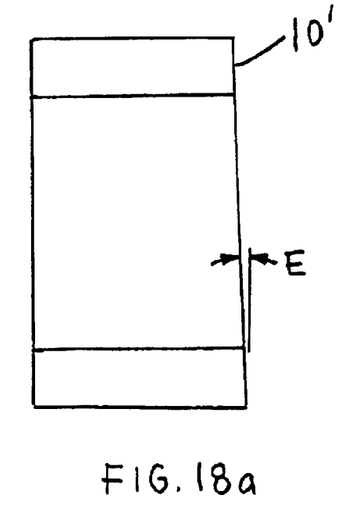
FIG. 18a is a top view of an open liner section with one angled end of an open modular ditch liner in accordance with the present invention.
Figure 18B:
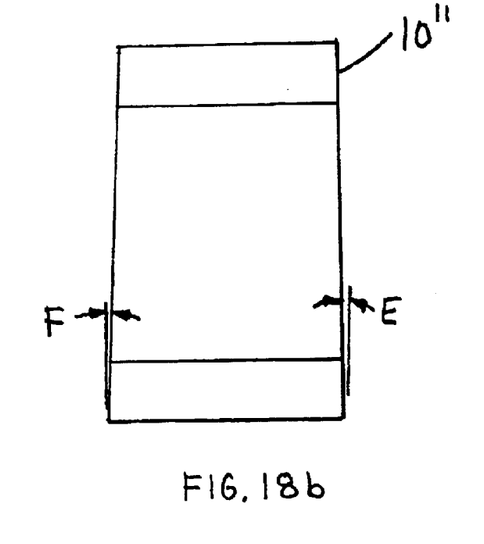
FIG. 18b is a top view of an open liner section with two angled ends of an open modular ditch liner in accordance with the present invention.

With reference to FIGS. 18a and 18b, an open liner section section may be formed as a trapezoid (viewed from a top) to allow the open liner sections 10', 10" to fit curved drain applications. One end of an open liner section 10' is terminated with an angle "E." One end of an open liner section 10" is terminated with an angle "E" and the other end of the open liner section 10" is terminated with an angle "F."

The length "L" of any open liner section 10, 10', 10," preferably has a value of between 7–14 inches. The length of any block alignment key 76, 76', preferably has a value of between 7–14 inches. The length of any riser block 82, 90, preferably has a value of between 7–14 inches. The modular ditch liner 1–3 may be used in other drainage applications, such as swales. It is preferable that adjacent open liner sections 10, 10', 10" be arranged to have a gap therebetween for drainage.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A method of creating a modular ditch liner comprising the steps of:

providing a plurality of open liner sections, forming a substantially concave shape in a top of each one of said plurality of open liner sections, locating two adjacent open liner sections of said plurality of open liner sections with a gap between ends thereof; and retaining each one said plurality of open liner sections relative to each other with at least one alignment key.

2. The method of creating a modular ditch liner of claim 1, further comprising the step of:

forming at least one positive taper key slot in each one of said plurality of open liner sections to receive said at least one alignment key.

3. The method of creating a modular ditch liner of claim 1, further comprising the step of:

forming at least one negative taper key slot in each one of said plurality of open liner sections to receive said at least one alignment key.

4. The method of creating a modular ditch liner of claim 1, further comprising the step of:

providing at least one interference alignment key for said at least one alignment key.

5. The method of creating a modular ditch liner of claim 1, further comprising the step of:

providing at least one extruded alignment key for said at least one alignment key, said at least one extruded alignment key having a key base and at least one key projection extending from said key base.

6. The method of creating a modular ditch liner of claim 1, further comprising the step of:

forming at least one substantially round key slot in each one of said plurality of open liner sections.

7. The method of creating a modular ditch liner of claim 1, further comprising the step of:

forming an angle on at least one end of at least one of said plurality of open liner sections.

8. The method of creating a modular ditch liner of claim 1, further comprising the step of:

forming at least one key slot in each one of said plurality of open liner sections, a block alignment key having a block base and a key projection extending from said block base, said key projection being sized to be received by said at least one key slot.

9. The method of creating a modular ditch liner of claim 1, further comprising the step of:

at least one of said plurality of open liner sections having a length between 7 to 14 inches.

10. A method of creating a modular ditch liner comprising the steps of:

providing a plurality of open liner sections, forming a substantially concave shape in a top of each one of said plurality of open liner sections;

forming at least one key slot in each one of said plurality of open liner sections; and providing a plurality of first riser blocks having a first side member and at least one first key projection extending from said first side member, said at least one key slot being sized to receive said at least one first key projection.

11. The method of creating a modular ditch liner of claim 10, further comprising the step of:

providing a plurality of second riser blocks having a second side member and at least one second key projection extending from said second side member, at least one first key slot being formed in said first side member, said at least one first key slot being sized to receive said at least one second key projection.

12. The method of creating a modular ditch liner of claim 10, further comprising the step of:

at least one of said plurality of open liner sections having a length between 7 to 14 inches.

13. The method of creating a modular ditch liner of claim 10, further comprising the step of:

locating two adjacent open liner sections of said plurality of open liner sections with a gap between ends thereof.

14. The method of creating a modular ditch liner of claim 10, further comprising the step of:

forming an angle on at least one end of at least one of said plurality of open liner sections.

15. A method of creating a modular ditch liner comprising the steps of:

providing a plurality of open liner sections, forming a substantially concave shape in a top of each one of said plurality of open liner sections, each one of said plurality of open liner sections having a length between 7 to 14 inches;

retaining each one of said plurality of open liner sections relative to each other with at least one alignment key; and locating two adjacent open liner sections of said plurality of open liner sections with a gap between ends thereof.

16. The method of creating a modular ditch liner of claim 15, further comprising the step of:

forming at least one positive taper key slot in each one of said plurality of open liner sections.

17. The method of creating a modular ditch liner of claim 15, further comprising the step of:

forming at least one negative taper key slot in each one of said plurality of open liner sections.

18. The method of creating a modular ditch liner of claim 17, further comprising the step of:

providing at least one interference alignment key for said at least one alignment key.

19. The method of creating a modular ditch liner of claim 15, further comprising the step of:

forming at least one substantially round key slot in said plurality of open liner sections.

20. The method of creating a modular ditch liner of claim 19, further comprising the step of:

providing at least one extruded alignment key for said at least one alignment key, said at least one extruded alignment key having a key base and at least one key projection extending from the key base.

* * * * *